Patented July 24, 1928.

1,678,085

UNITED STATES PATENT OFFICE.

WINFIELD SCOTT, OF AKRON, OHIO, ASSIGNOR TO THE RUBBER SERVICE LABORATORIES CO., OF AKRON, OHIO, A CORPORATION OF OHIO.

METHOD OF PRODUCING VULCANIZED RUBBER.

No Drawing. Original application filed September 9, 1926, Serial No. 55,386. Divided and this application filed May 19, 1926. Serial No. 110,295.

The present invention is directed to the art of producing vulcanized rubber. The invention is particularly concerned with the manufacture of a vulcanized rubber composition of commercial value and importance by employing as an accelerator of the vulcanization process, a new type of compound for this purpose as is hereinafter fully set forth and described.

It is well known in chemistry that the aldehydes and particularly the aliphatic aldehydes, react with certain types of organic compounds such as the amines and certain amino derivatives and the like to produce new materials known as condensation products. These products are commonly termed Schiff's bases. Not only do aldehydes react in this manner with the primary amino compounds, but they will likewise combine or condense with the secondary amines.

In United States Patent No. 1,586,121, granted May 25, 1926, there was claimed a process of preparing vulcanized rubber by employing as a vulcanization accelerator, a compound produced by reacting carbon bisulfid upon the reaction product of a secondary amine, for example piperidine with an aldehyde, such as formaldehyde. The present application is a division of this earlier application referred to and is directed particularly to the use, as a rubber vulcanization accelerator, of the carbon bisulfid derivative of the reaction product of a secondary amine, such as piperidine, with an unsaturated aldehyde and especially with an unsaturated cyclic aldehyde.

One method whereby such a compound may be manufactured is as follows. A secondary amine, for example piperidine, is reacted with an unsaturated aldehyde, as furfuraldehyde, preferably in the proportion of two molecular parts by weight of the amine to one molecular proportion by weight of the aldehyde, and the resulting product is further reacted with one molecular proportion of carbon bisulfid. The reactions may be carried out with or without the use of any suitable solvent as is desired. The resulting product, in the case of the substances mentioned is a dark colored material of tar-like consistency. In a similar manner, the carbon bisulfid derivative of the reaction product of other secondary amines and other aldehydes, such as aldol, crotonaldehyde, cinnamicaldehyde, heptaldehyde, acrolein and the like may be prepared.

Broadly then, the carbon bisulfid reaction product of the condensation product of other secondary amines, and particularly of other cyclic amines preferably containing a nitrogen atom in the ring, with aldehydes may be prepared in a similar manner. Thus, in place of piperidine mentioned, di-ethylene-di-amine, pyrollidine, piperazine, hydroquinoline, alkyl derivatives such as $\alpha$- or $\beta$-piperidine, the alkyl derivatives of cyclic amines, tetra-hydro-quinaldine, the dialkyl-amines such as di-ethyl-amine, and di-benzyl-amine and other secondary aliphatic and aromatic amines as well as hydro-collidine and other compounds present in commercial pyridine may be used. These various compounds and other related materials may be combined in the proportions stated or in other proportions if desired, with aldehydes such as formaldehyde, or acetaldehyde and their polymeric forms, or with propionaldehyde, butraldehyde, iso-valeric aldehyde and other aliphatic aldehydes, with acrolein or crotonaldehyde or other unsaturated aldehydes, with oxy-aldehydes such as aldol, or with aromatic aldehydes such as benzaldehyde, cinnamic aldehyde and the like or with ring compounds such as furfuraldehyde, and the product reacted with carbon bisulfid in the manner as described.

All the compounds hereinbefore described and particularly the carbon bisulfid derivative of the reaction product of piperidine and furfuraldehyde prepared in the manner as described, may be used as accelerating agents of the vulcanization of rubber. The accelerators named are extremely rapid in their action and may be used advantageously in so called cold cure cements. The accelerators likewise may be emloyed in heat cured rubber goods as is shown by the following examples. A rubber composition intended for use as a friction stock for a tire comprises 100 parts of pale crepe rubber, 5 parts of zinc oxide, 2.5 parts of sulphur and 0.2 parts of one of my new accelerators of the class described such for example as the carbon bisulfid derivative of the reaction product of piperidine and furfuraldehyde.

The above composition may be readily prepared in the usual and well known manner by plasticizing or breaking down the rubber on the differential mixing mills and then mixing homogeneously therein the filler, vulcanizing agent and accelerator. The composition is then cured under pressure in molds for a period of time necessary to give a commercial vulcanized product depending on the pressure employed. It has been found, in the case of the mixture described that a commercial vulcanized product is produced after heating for approximately one hour at a temperature of approximately 240° F., which is equivalent to ten pounds gauge pressure per square inch. The vulcanized product is found to possess a tensile strength of about 2400 pounds per square inch.

Other vulcanization temperatures than than mentioned in the example may be employed if desired. I have found that the rubber composition described may for example be completely vulcanized by heating for approximately fifteen minutes at the temperature given by forty pounds of steam pressure per square inch or after heating for approximately three hours at the temperature given by a steam pressure of approximately five pounds per square inch. It is apparent then that a vulcanized rubber of high quality results from the use of my new type of accelerators under varying curing conditions.

Other rubber compositions may likewise be prepared by employing any of my new type of accelerators. Thus, a semi-translucent stock that may be used in the manufacture of druggist sundries, such as hot water bottles, nipples, etc., may be prepared from a mixture comprising 100 parts of pale crepe rubber, 0.5 parts of zinc oxide, 1.5 parts of sulfur and 0.5 parts of one of my new accelerators of the type set forth herein. This mixture will yield a commercial product when vulcanized for approximately 25 minutes under the pressure of approximately 20 pounds of steam per square inch.

The accelerators as herein described may likewise be employed in the manufacture of a hard rubber. Thus, for example, 100 parts of pale crepe rubber, 150 parts of zinc sulfid, 5 parts of zinc oxide, 70 parts of sulfur and 2 parts of any of my preferred class of accelerators may be mixed together in the usual manner and cured for a period of approximately one hour and 45 minutes at a pressure of 40 pounds of steam per square inch. A bright red hard rubber of high quality may be obtained by incorporating into the above composition substantially 20 parts of a suitable coloring material, such as a naphthalamine color. Other dyes may, of course, be used if desired.

The accelerators herein described are sufficiently rapid in their action to produce a cure in a cement composition. Thus, a mixture of 100 parts of pale crepe rubber, 3.5 parts of sulfur, 5 parts of zinc oxide and 0.5 parts of accelerator will produce a cement which will cure at room temperature upon standing for a suitable period of time. Other uses of my preferred type of accelerator are apparent from the examples hereinbefore described.

It is to be understood that my invention is not limited by any theory set forth in explanation of the facts involved nor are the examples given to be considered as limitative of my invention. For example, it is within the scope of my invention, when my preferred compounds are used in the acceleration of a so called cold cure or rubber cement, that instead of using the accelerators in the form as disclosed, I may use the reaction product of the aldehyde and the imino compound and add this compound to a rubber compound wherein carbon bisulfid is present in or is used as the carrier liquid in the cement. By such a process, my new class of compounds are formed in situ and exert their accelerating powers as formed. Other means of using the accelerators herein described are apparent to those skilled in the art. It is, of course, possible to use other types of rubber than that mentioned in the examples while other fillers may be employed together with or in place of zinc oxide. My invention is, then to be regarded as defined solely by the claims hereinafter set forth wherein I intend to claim all novelty permissible in view of the prior art.

What I claim is:

1. The process of manufacturing vulcanized rubber which comprises heating rubber and sulphur in the presence of the carbon bisulfid derivative of the reaction product of a secondary amine and an unsaturated aldehyde.

2. The process of manufacturing vulcanized rubber which comprises heating rubber and sulphur in the presence of the carbon bisulfid derivative of the reaction product of a secondary amine and a cyclic aldehyde.

3. The process of manufacturing vulcanized rubber which comprises heating rubber and sulphur in the presence of the carbon bisulfid derivative of the reaction product of a secondary amine and an unsaturated cyclic aldehyde.

4. The process of manufacturing vulcanized rubber which comprises heating rubber and sulphur in the presence of the carbon bisulfid derivative of the reaction product of a secondary amine and an aldehyde containing more than two carbon atoms.

5. The process of manufacturing vulcanized rubber which comprises heating rubber and sulphur in the presence of the carbon bisulfid derivative of the reaction product of a secondary amine and with furfuraldehyde.

6. The process of manufacturing vulcanized rubber which comprises heating rubber and sulphur in the presence of the carbon bisulfid derivative of the reaction product of a completely hydrogenated cyclic imino compound and an unsaturated aldehyde.

7. The process of manufacturing vulcanized rubber which comprises heating rubber and sulphur in the presence of the carbon bisulfid derivative of the reaction product of a completely hydrogenated cyclic imino compound and a cyclic aldehyde.

8. The process of manufacturing vulcanized rubber which comprises heating rubber and sulphur in the presence of the carbon bisulfid derivative of the reaction product of a completely hydrogenated cyclic imino compound and an unsaturated cyclic aldehyde.

9. The process of manufacturing vulcanized rubber which comprises heating rubber and sulphur in the presence of the carbon bisulfid derivative of the reaction product of a completely hydrogenated cyclic imino compound and an aldehyde containing more than two carbon atoms.

10. The process of manufacturing vulcanized rubber which comprises heating rubber and sulphur in the presence of the carbon bisulfid derivative of the reaction product of a completely hydrogenated cyclic imino compound and furfuraldehyde.

11. The process of manufacturing vulcanized rubber which comprises heating rubber and sulphur in the presence of the carbon bisulfid derivative of the reaction product of piperidine and an unsaturated aldehyde.

12. The process of manufacturing vulcanized rubber which comprises heating rubber and sulphur in the presence of the carbon bisulfid derivative of the reaction product of piperidine and a cyclic aldehyde.

13. The process of manufacturing vulcanized rubber which comprises heating rubber and sulphur in the presence of the carbon bisulfid derivative of the reaction product of piperidine and an unsaturated cyclic aldehyde.

14. The process of manufacturing vulcanized rubber which comprises heating rubber and sulphur in the presence of the carbon bisulfid derivative of the reaction product of piperidine and an aldehyde containing more than two carbon atoms.

15. The process of manufacturing vulcanized rubber which comprises heating rubber and sulphur in the presence of the carbon bisulfid derivative of the reaction product of piperidine and furfuraldehyde.

16. The vulcanized rubber product obtained by heating rubber and a vulcanizing agent in the presence of the carbon bisulfid derivative of the reaction product of a secondary amine and an unsaturated aldehyde.

17. The vulcanized rubber product obtained by heating rubber and a vulcanizing agent in the presence of the carbon bisulfid derivative of the reaction product of a secondary amine and a cyclic aldehyde.

18. The vulcanized rubber product obtained by heating rubber and a vulcanizing agent in the presence of the carbon bisulfid derivative of the reaction product of a secondary amine and an unsaturated cyclic aldehyde.

19. The vulcanized rubber product obtained by heating rubber and a vulcanizing agent in the presence of the carbon bisulfid derivative of the reaction product of a secondary amine and an aldehyde containing more than two carbon atoms.

20. The vulcanized rubber product obtained by heating rubber and a vulcanizing agent in the presence of the carbon bisulfid derivative of the reaction product of a secondary amine and furfuraldehyde.

21. The vulcanized rubber product obtained by heating rubber and a vulcanizing agent in the presence of the carbon bisulfid derivative of the reaction product of a completely hydrogenated cyclic imino compound and an unsaturated aldehyde.

22. The vulcanized rubber product obtained by heating rubber and a vulcanizing agent in the presence of the carbon bisulfid derivative of the reaction product of a completely hydrogenated cyclic imino compound and a cyclic aldehyde.

23. The vulcanized rubber product obtained by heating rubber and a vulcanizing agent in the presence of the carbon bisulfid derivative of the reaction product of a completely hydrogenated cyclic imino compound and an unsaturated cyclic aldehyde.

24. The vulcanized rubber product obtained by heating rubber and a vulcanizing agent in the presence of the carbon bisulfid derivative of the reaction product of a completely hydrogenated cyclic imino compound and furfuraldehyde.

25. The vulcanized rubber product obtained by heating rubber and a vulcanizing agent in the presence of the carbon bisulfid derivative of piperidine and an unsaturated aldehyde.

26. The vulcanized rubber product obtained by heating rubber and a vulcanizing agent in the presence of the carbon bisulfid derivative of piperidine and a cyclic aldehyde.

27. The vulcanized rubber product obtained by heating rubber and a vulcanizing agent in the presence of the carbon bisulfid derivative of piperidine and an unsaturated cyclic aldehyde.

28. The vulcanized rubber product obtained by heating rubber and a vulcanizing agent in the presence of the carbon bisulfid derivative of piperidine and an aldehyde containing more than two carbon atoms.

29. The vulcanized rubber product obtained by heating rubber and a vulcanizing agent in the presence of the carbon bisulfid derivative of piperidine and furfuraldehyde.

Signed at Akron, in the county of Summit, and State of Ohio, this 14th day of May, A. D. 1926.

WINFIELD SCOTT.